(12) United States Patent
Gallego et al.

(10) Patent No.: US 7,472,858 B2
(45) Date of Patent: Jan. 6, 2009

(54) LINE MAGAZINE

(75) Inventors: Jose Manuel Algüera Gallego, Aschaffenburg (DE); Ernst Martin Richter, Frankfurt am Main (DE); Michael Eiermann, Pfungstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 377 days.

(21) Appl. No.: 11/227,932

(22) Filed: Sep. 15, 2005

(65) Prior Publication Data

US 2006/0054728 A1 Mar. 16, 2006

(30) Foreign Application Priority Data

Sep. 16, 2004 (DE) .................. 10 2004 044 992

(51) Int. Cl.
*B65H 75/48* (2006.01)
(52) U.S. Cl. ..................................... 242/376
(58) Field of Classification Search ............. 242/378.3, 242/379, 398, 371, 376, 378.1, 378.2; 280/420, 280/421, 422
See application file for complete search history.

(56) References Cited

U.S. PATENT DOCUMENTS

| | | | |
|---|---|---|---|
| 3,773,987 A | 11/1973 | Davis et al. | |
| 4,010,913 A * | 3/1977 | Guerster et al. | 242/378.1 |
| 4,053,118 A * | 10/1977 | Aikins | 242/378.2 |
| 4,417,703 A | 11/1983 | Weinhold | |
| 5,129,828 A | 7/1992 | Bass | |
| 6,328,243 B1 * | 12/2001 | Yamamoto | 242/378.1 |
| 6,616,080 B1 * | 9/2003 | Edwards et al. | 242/378.1 |
| 7,172,150 B1 * | 2/2007 | Hutchison et al. | 242/375.2 |

FOREIGN PATENT DOCUMENTS

| | | |
|---|---|---|
| DE | 817 556 | 10/1951 |
| DE | 817 556 B | 10/1951 |
| DE | 101 55 056 | 6/2003 |
| DE | 101 55 056 A1 | 6/2003 |
| JP | 2000 085 639 A | 3/2000 |

* cited by examiner

*Primary Examiner*—Peter M. Cuomo
*Assistant Examiner*—William E Dondero
(74) *Attorney, Agent, or Firm*—Hudak, Shunk & Farine Co. LPA (57) ABSTRACT

A line magazine for a supply line on a semimounted trailer with a king pin and a wedge connector pivoted on the king pin is described. The underlying problem of the invention was to provide a line magazine which prevents the supply line from hanging down in a mechanically simple way, while on the other hand it provides a constant pretensioning of the supply line. The problem is solved according to the invention with a line magazine that comprises a housing and a drum disk mounted in the housing and able to rotate, while the drum disk is preloaded by a spring element and the supply line engages by its front segment of line with the wedge connector and is led out from the housing by its rear segment of line in fixed manner.

22 Claims, 7 Drawing Sheets

LINE MAGAZINE

FIELD OF THE INVENTION

The invention concerns a line magazine for a supply line on a semi-mounted trailer with a king pin and a wedge connector pivoted on the king pin.

BACKGROUND OF THE INVENTION

The coupling of a semi-mounted trailer on a tractor generally occurs by backing up the tractor underneath the trailer, whereupon a king pin arranged on the underside of the trailer engages with a fifth wheel located on the tractor and is then locked. For the uncoupling, the trailer is parked in usual manner, the fifth wheel is opened, and the tractor is driven out. To optimize the working conditions of long-haul drivers, there are efforts to automate the coupling and uncoupling of the trailer and the truck or to control this process remotely from the driver's cabin of the truck. In connection with such remotely controllable fifth wheels, there are already systems in existence that undertake the connecting of supply lines between tractor and trailer in automated manner, along with the coupling and uncoupling of the trailer. By supply lines is meant primarily cables for transmission of electrical energy, but also pneumatic or hydraulic lines.

A proven system for connecting the supply lines by a coupling of the trailer comprises a wedge connector that is pivoted on the king pin, per DE 101 55 056 A1, which fits into the wedge-shaped entry opening when the king pin is introduced into the fifth wheel, where it mates with plug contacts. When the tractor drives along curves, the wedge connector is form-fitted in the entry opening and turns relative to the trailer. For this reason, it is necessary to provide a sufficient length of supply line at the trailer side, in order to avoid a breaking of the supply line between the wedge connector and the fifth wheel when negotiating a tight curve. The main drawback, which leads to systematic failures, is that the supply line hangs down when driving on a straight stretch of road and thus there is a risk of damage or breaking.

In order to avoid damage to supply lines between a tractor and a trailer, so-called line magazines are already known from the prior art, which maintain the connection line under a tensile stress by means of a spring-loaded cable drum. One such line magazine is disclosed, for example, in DE 817 556 B and comprises a housing with a cable drum mounted therein, able to turn on a hollow axle. The connection line in the noncoupled condition is wound up until the connector touches the housing. The portion wound onto the cable drum is connected to a fixed cable segment led out through the hollow axle via a flat cable connected to both parts. However, this design has proven to be unreliable in daily use, since the use of three cable segments with two connection sites has led to breakages.

For this reason, the basic problem of the invention was to provide a robust line magazine, which prevents the supply line from hanging down in a mechanically simple way, while on the other hand it provides a constant pretensioning of the supply line.

SUMMARY OF THE INVENTION

The problem is solved according to the invention with a line magazine that comprises a housing and a drum disk mounted in the housing and able to rotate, while the drum disk is preloaded by a spring element and the supply line engages by its front segment of line with the wedge connector and is led out from the housing by its rear segment of line in fixed manner.

When driving straight, the supply line is for the most part retracted and wound up on the drum disk, so that the supply line is excellently protected against damage, on the one hand, while on the other hand the preloading of the drum disk allows the supply line to unwind when traveling along a curve so that the trailer can swivel relative to the tractor. Furthermore, the supply line is under such tension that, when the trailer swings back after negotiating the curve, there is no danger that parts of the supply line will get caught between the tractor and the trailer.

Another benefit of the line magazine is that even when riding without a trailer, the wedge connector is constantly oriented in a ready to enter position, due to the pretensioning of the supply line. This precludes the risk of having a wrongly oriented wedge connector when recoupling a trailer to the fifth wheel or its wedge-shaped entry opening, thereby damaging it.

Thanks to the flat configuration of the drum disk, the line magazine overall can be designed rather flat and thus can swivel together with the trailer across the rear end of the tractor when negotiating a curve.

The above indicated structural configuration has a continuous, single-piece supply line, which extends from the wedge connector to the exit of the housing or to the consuming devices of the trailer. This substantially improves the operational availability as compared to systems which are based on a rotary transmission, for example, using contact rings or slip brushes. The latter are unsuitable for use in the exposed position underneath a trailer, because of their high vulnerability to failure, dictated in particular by moisture-caused corrosion.

Preferably, a drum jacket is formed at the radially outer end of the drum disk, on which the front line segment rests. This drum jacket serves both for guidance and to accommodate the front line segment, which can be led out from the line magazine.

The rear line segment, on the contrary, can be laid spirally on the drum disk. It is especially advantageous for the drum jacket to have an opening and for the supply line to be fastened to the drum disk and/or the drum jacket, being fixed at the jacket opening. In this configuration, the supply line is divided by the fastening located in the region of the jacket opening into a front line segment, reaching from the wedge connector to the fastening point, and a rear line segment, extending from the fastening point to the outside of the housing.

The front line segment can be laid as a multiple winding on the drum jacket. For the pull-out lengths required in practical use for the front line segment, 2 or 3 turns laid one on top of the other have proven to work well. Thanks to the multiple winding, a minimal height of the drum jacket is required.

In order to assure a smooth winding and unwinding of the front line segment of the supply line, the drum jacket should completely surround the drum disk in the circumferential direction.

A precise guidance of the front line segment is achieved when the drum jacket is configured as a groove profile, especially a U-profile. The U-profile is formed complementary in shape to the cross section of the supply line and thereby protects the front line segment in the region where it contacts the drum jacket.

The groove profile or the U-profile should have an aperture width slightly larger than the diameter of the supply line. This will prevent overshooting during the wind-up.

In order to accommodate several turns lying one on top of the other, the groove profile or the U-profile must have a depth corresponding at least to the sum of the diameters of the number of turns lying of the drum jacket. Preferably, the depth of the profile should correspond at least to twice the diameter of the supply line.

Advantageously, the spring element is a spiral spring. This can be arranged in a spring space bounded off from the supply line by the drum disk. From this arrangement, one infers that the supply line, for example, its rear line segment, is arranged on the drum disk, and the spiral spring is arranged beneath the drum disk. In an alternative configuration, the spiral spring can also be arranged on the drum disk and the supply line can lie on the inside of the housing, underneath the drum disk.

In one favorable embodiment, the spiral spring is fastened stationary to the housing by its first end, and its second end engages with the drum disk and/or the drum jacket. It is especially advantageous for the first end to be fastened in the radial direction on the outside of the housing, and the second end to engage with the drum disk on the inside.

One stable configuration of the line magazine can be achieved by mounting the drum disk on a stationary mandrel bearing positioned in the housing. The mandrel bearing can then extend entirely through the housing and thereby stabilize the housing, as well as enable a stable mounting of the drum disk.

BRIEF DESCRIPTION OF THE DRAWINGS

For better comprehension, the invention shall now be explained more closely by means of the following eight drawings. These show.

DETAILED DESCRIPTION OF THE INVENTION

Figure 1:
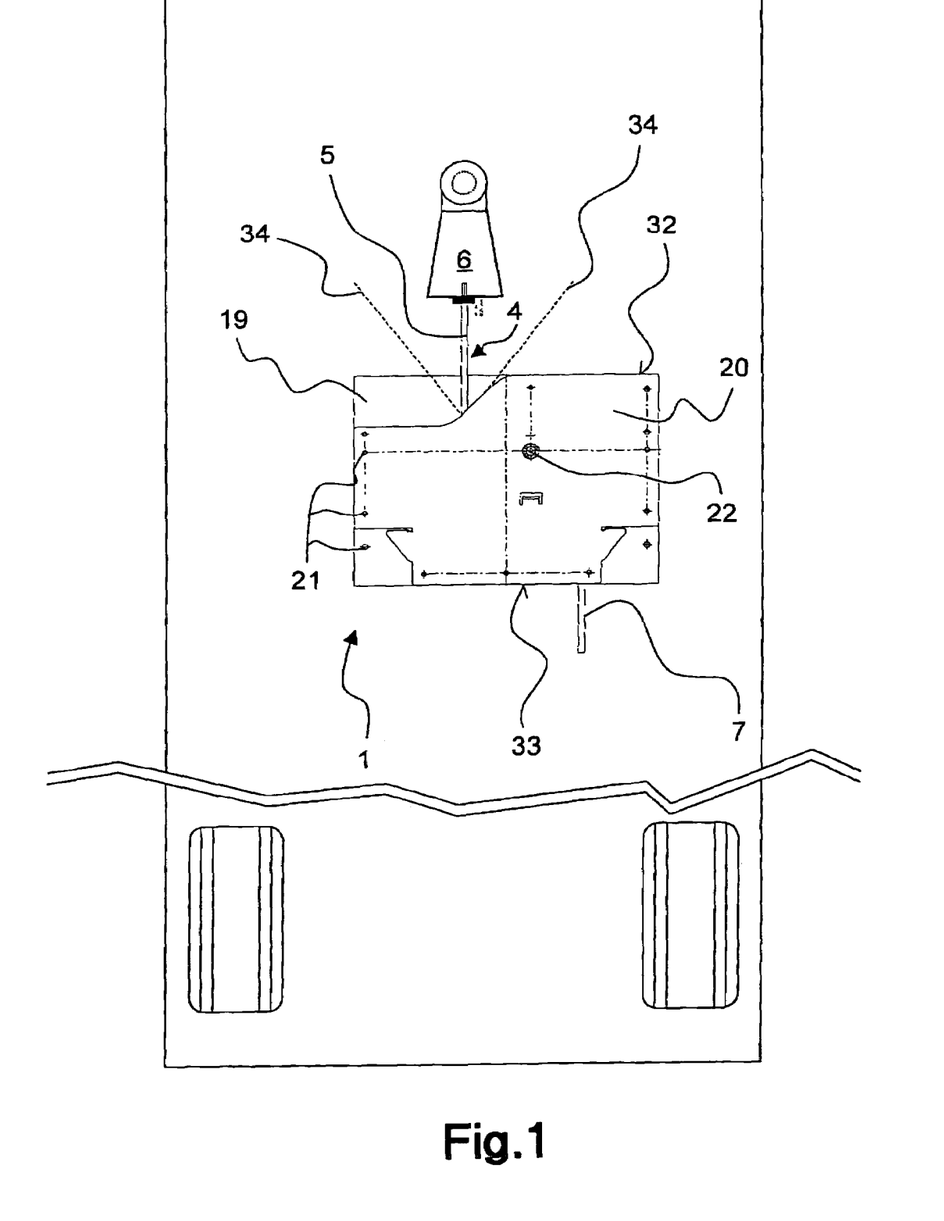
FIG. 1: a bottom view of the line magazine.

FIG. 1 shows a bottom view of the housing 1 of the line magazine with a partly protruding supply line 4, designed to cushion a tension loading. This can be achieved, for example, in the case of cables, by a jacket which absorbs tensile forces. The housing 1 is composed of the tub 20 and the screwed-on cover 19. In the bottom view of FIG. 1, the housing cover 19 is visible in three corner regions. For the fastening of the line magazine to the underside of a trailer (not shown), the housing 1 has fastening holes 21 at two opposite sides and at the rear side 33, which extend continuously through the housing cover 19 and the housing tub 20.

In the direction of the front end 32, a front line segment 5 is shown partly drawn out from the housing 1. At the end of the front line segment 5 is arranged a trapezoidally tapering wedge connector 6, which can be introduced into a complementary shaped inlet opening of a fifth wheel and thus enable, for example, an electrical connection. The front line segment 5 is introduced into the wedge connector 6 and secured to it, tension-relieved.

When the tractor (not shown) negotiates a curve, the trailer will swing out relative to the tractor. In this case, the wedge connector 6 can swing along with it and the front line segment 5 will be pulled out from the housing 1. The maximum extension for the line magazine depicted is 850 mm. For example, the broken lines show two swing-out positions 34 of the front line segment 5.

On the rear side 33 of the housing 1, the rear line segment 7 of the supply line 4 is led out from the housing 1. This rear line segment 7 is uncoupled from the extension and retraction movements of the front line segment 5. Therefore, the rear line segment 7 can be connected in simple manner to the stationary lines laid on the trailer.

Figure 2:
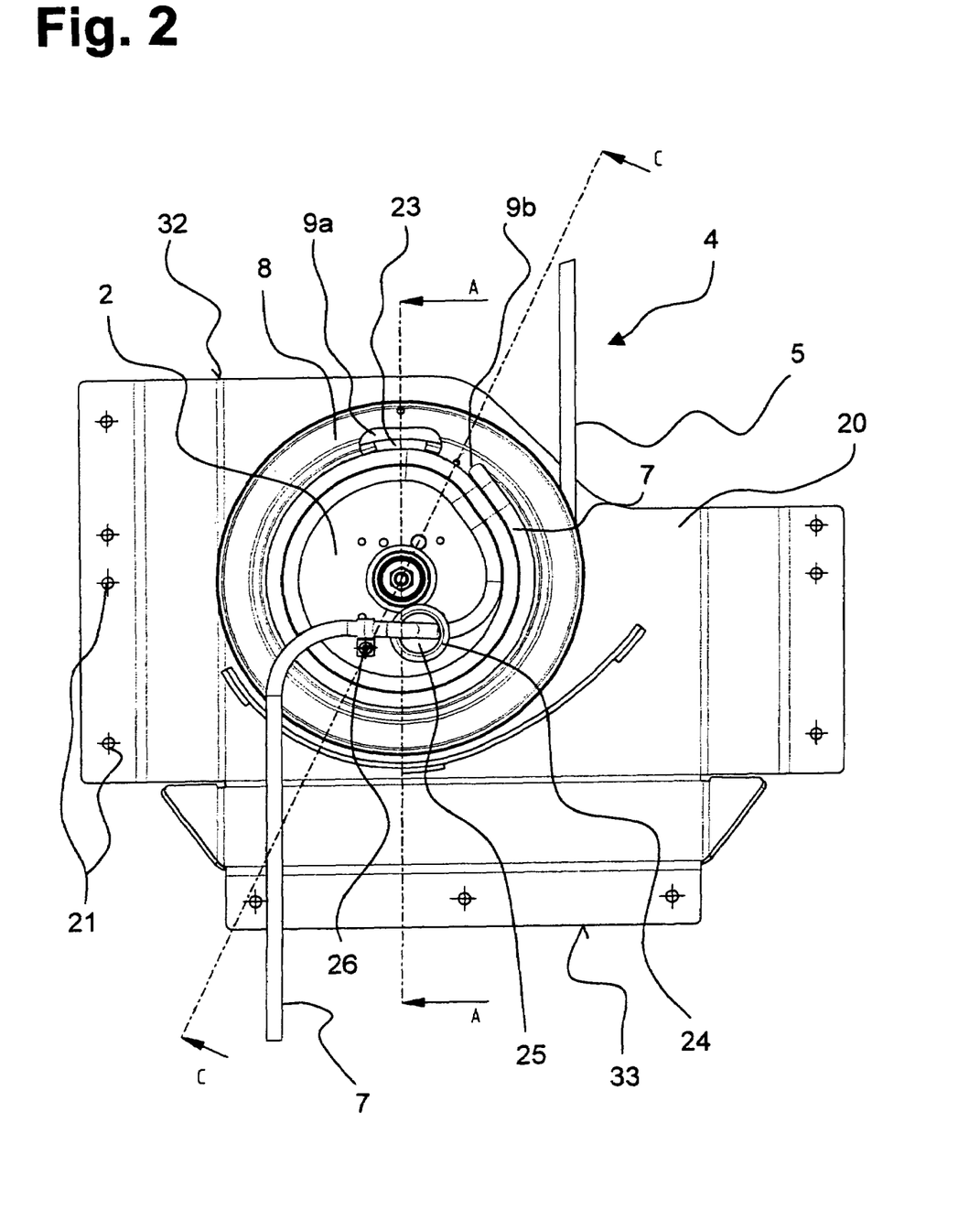
FIG. 2: a top view of the line magazine with housing cover removed.

FIG. 2 shows a top view of the line magazine with the housing cover 19 removed. In a middle region of the housing tub 20 there is mounted a drum disk 2 which can turn, and the supply line 4 is partly wound up on it. At the front end 32, the front line segment 5 of the supply line 4 emerges tangentially from a drum jacket 8. The drum jacket 8 is formed at the radially outer end of the drum disk 2 and serves exclusively to accommodate the front line segment 5. The front line segment 5 is for the most part wound up in the line magazine shown in FIG. 2.

The front line segment 5 is laid clockwise on the drum jacket 8 in the top view and can be recognized in the jacket opening 9a. Directly inside the jacket opening 9a is a line attachment 23, which fixes the supply line 4 to the drum disk 2. In a second jacket opening 9b, the supply line 4 pushes through the drum jacket 8 and is laid in a spiral on the drum disk 2 in the same direction of winding as in the drum jacket 8. The rear line segment 7 is wound up inwardly in a spiral roughly two times and emerges at the top through an opening 25 in the housing through the cover 19, not shown in FIG. 2.

Starting from this line attachment 23, the supply line 4 is divided into the front line segment 5, which lies on the drum jacket 8 and can be at least partly extended and retracted from the housing 1 (see FIG. 1), and the rear line segment 7, which lies on the drum disk 2 and can be led out from the housing 1 is a stationary manner (see. FIG. 1).

For sealing purposes and to avoid damage to the rear line segment 7 from rubbing against the housing opening 25, a rubber sleeve 24 is installed in the housing opening 25. Furthermore, the rear line segment 7 is secured to the housing cover 19 (also see FIG. 5) with a clamp fitting 26.

Figure 3:
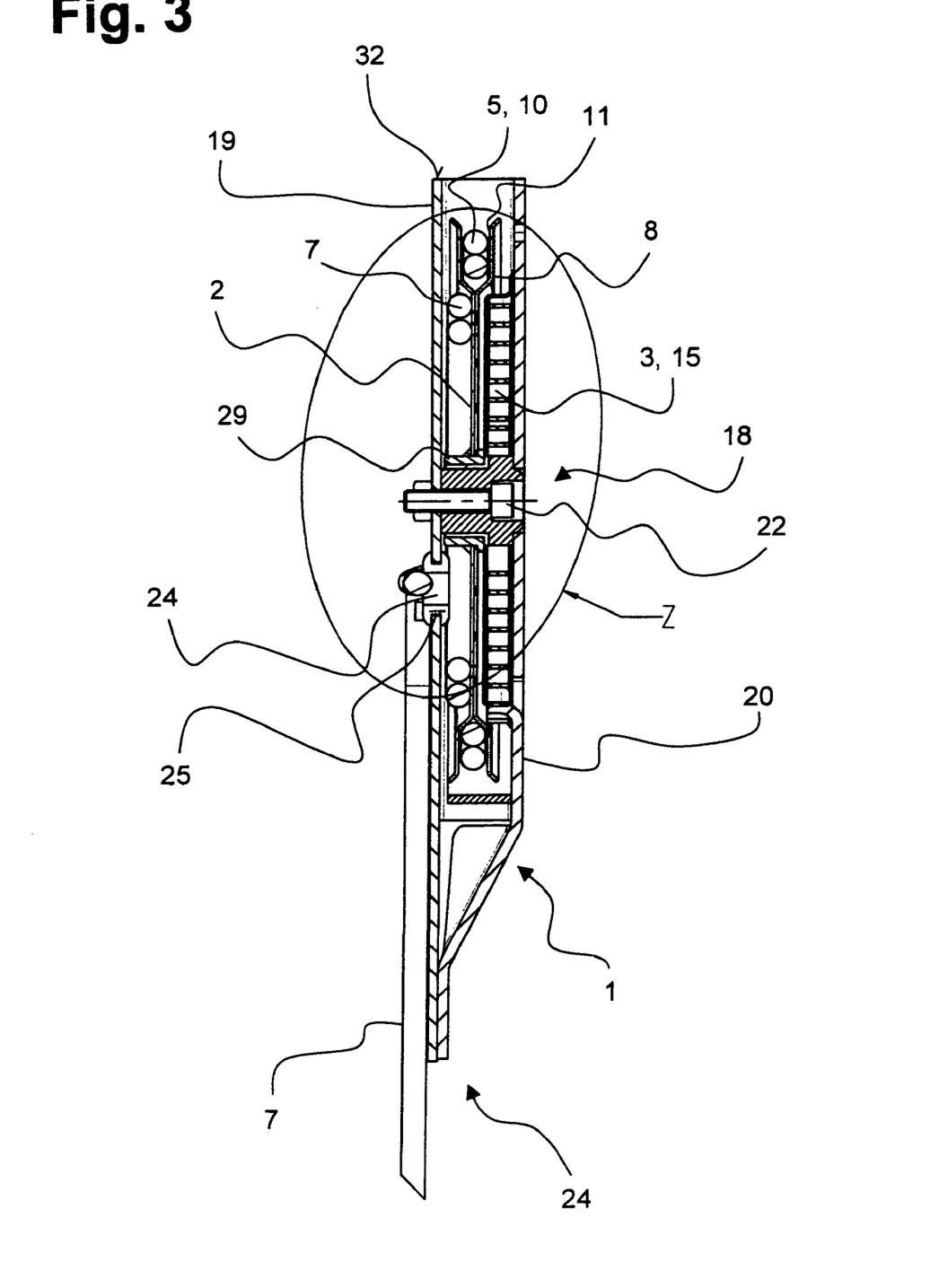
FIG. 3: a cross section along line A-A of FIG. 2.

FIG. 3 shows a cross section along line A-A in FIG. 2. The housing 1 is composed of the housing tub 20, on which is secured the housing cover 19, while the housing 1 is open at its front side 3, allowing the front line segment 5 to swing in accordance with the relative movement of the wedge connector 6 (see FIG. 1).

In the outer region of the drum disk 2, one notices the drum jacket 8, fashioned with a forklike groove profile 11, which entirely surrounds the drum disk 2 in the circumferential direction. The drum jacket 8 receives the front line segment 5, which is wound in two layers, one on top of the other, as a multiple winding 10 in a first level on the drum jacket 8.

Inside the drum jacket 8, the drum disk 2 is concave on either side and it receives the rear line segment 7, likewise wound in two layers one inside the other, in a second level at the cover 19 side of the housing. The front line segment 5 of the line magazine as depicted in FIG. 3 is in a largely wound-up condition. During the pulling out of the front line segment 5 and a resulting rotational movement of the drum disk 2, the turns of the spirally wound rear line segment 7 migrate inward. When the front line segment 7 is fully extended, there are three or four turns present on the drum disk 2, the inner one of which can come to lie against a drum sleeve 29.

At the tub 20 side of the housing, a spring space 15 is formed beneath the drum disk 2, in which a spring element 3 is arranged coaxial to the drum disk 2. The spring element 3 is a spiral spring, one end of which is fastened stationary to the housing 1 and the opposite end is fastened to the drum disk 2, ensuring a defined restoring force of the drum disk 2.

Figure 4:
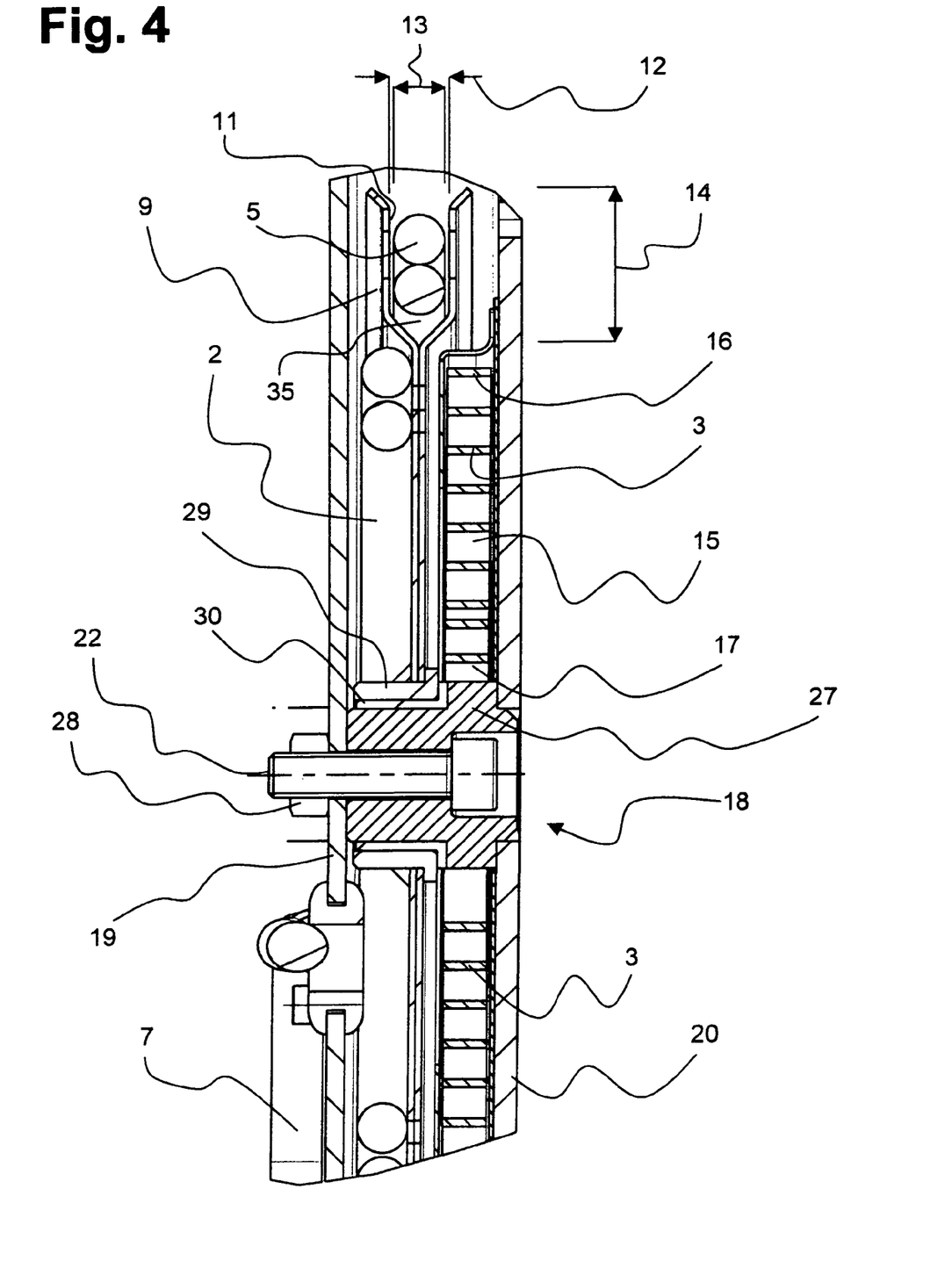
FIG. 4: an enlarged feature per FIG. 3.

FIG. 4 shows an enlarged feature of the region designated as Z in FIG. 3. One recognizes here the drum disk 2, mounted at the center in a mandrel bearing 18, extending between the housing tub 20 and the housing cover 19. A major component of the mandrel bearing 18 is the pedestal 27, through which is inserted a retaining screw 22. With the help of a nut 28 screwed on from the cover 19 side of the housing, the housing cover 19 and the housing tub 20 are screwed together, giving the housing (see. FIG. 3) great stability.

At the same time, the bearing pedestal 27 serves as an upright thrust bearing for the drum disk 2, rotating about the pedestal 27. For a low-wear operation and a favorable flow of force, the drum sleeve 29 is inserted at the center of the drum disk 2 and this, in turn, has a slide bearing 30 pressed into it. The slide bearing 30 consequently turns together with the drum disk 2 about the upright bearing pedestal 27.

Moreover, FIG. 4 shows the configuration of the drum jacket 8. The groove profile 11 is shaped as a U-profile and opened at the radially outer end to receive the front line segment 5. The U-profile has two parallel legs, which stand opposite each other with an aperture width 12. The aperture width 12 is only slightly larger than the diameter 13 of the supply line 4. At the lowest point 35 of the profile, the two legs of the U-profile merge to form a cone. The overall depth 14 of the groove profile 11 extends from the outermost edge of the drum jacket 8 to the lowest point 35 of the profile, while basically the segment of the parallel legs of the U-profile is suitable for receiving the front line segment 5 and it should have at least a depth able to accommodate two turns of the front line segment 5 wound on each other.

Figure 5:
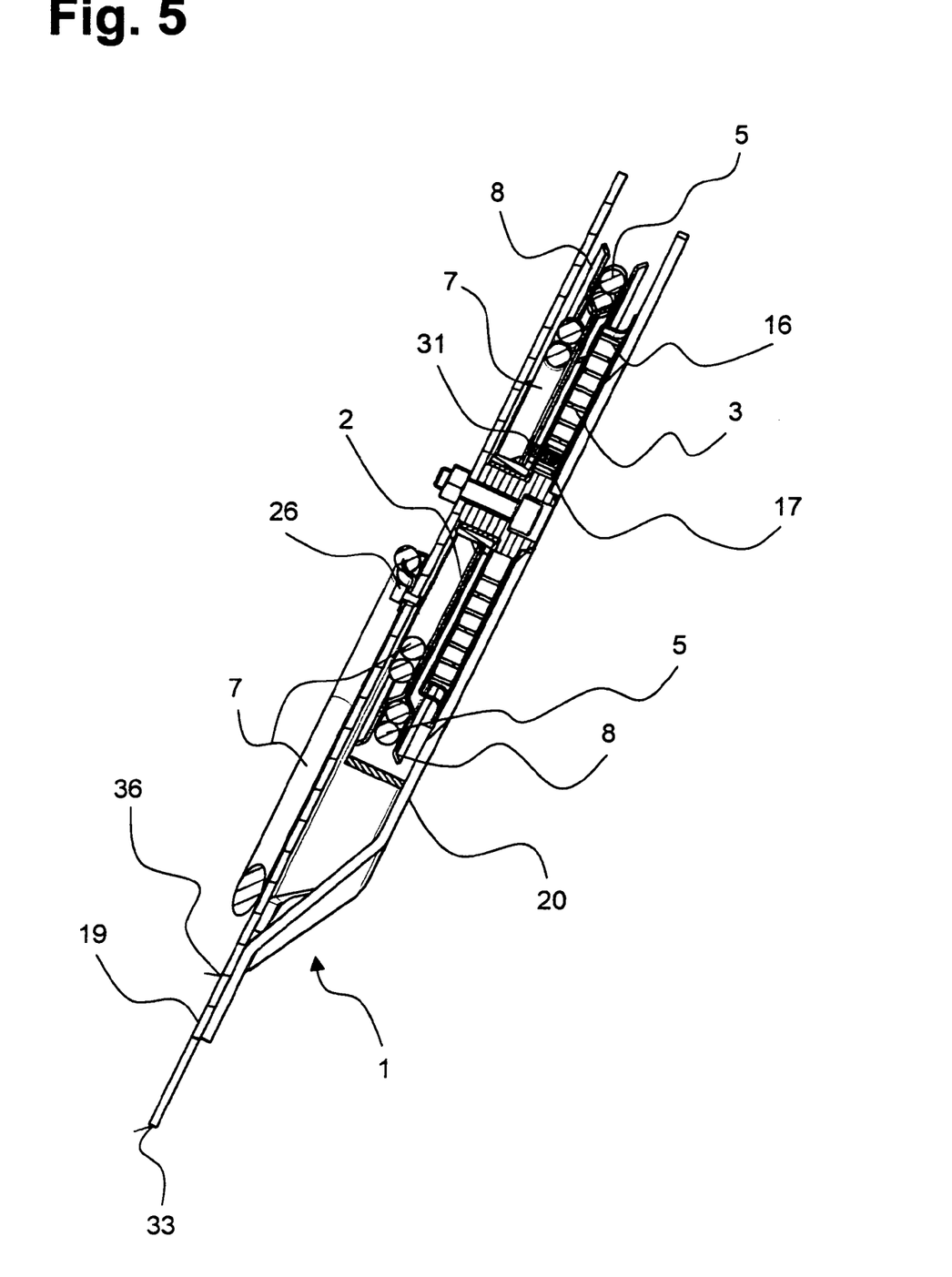
FIG. 5: a cross section along line C-C of FIG. 2.

FIG. 5 shows another cross section through the line magazine along line C-C of FIG. 2. This shows how the rear line segment 7 is led out from the housing 1. It is led after the exit, not shown in FIG. 5, through the housing opening 25 (see FIG. 3) on the top side 36 of the housing cover 19 in the direction of the rear side 33. For this, the clamp fitting 26 is arranged on the housing cover 19 for a stationary fixation of the rear line segment 7 to the top side 36.

Figure 6:
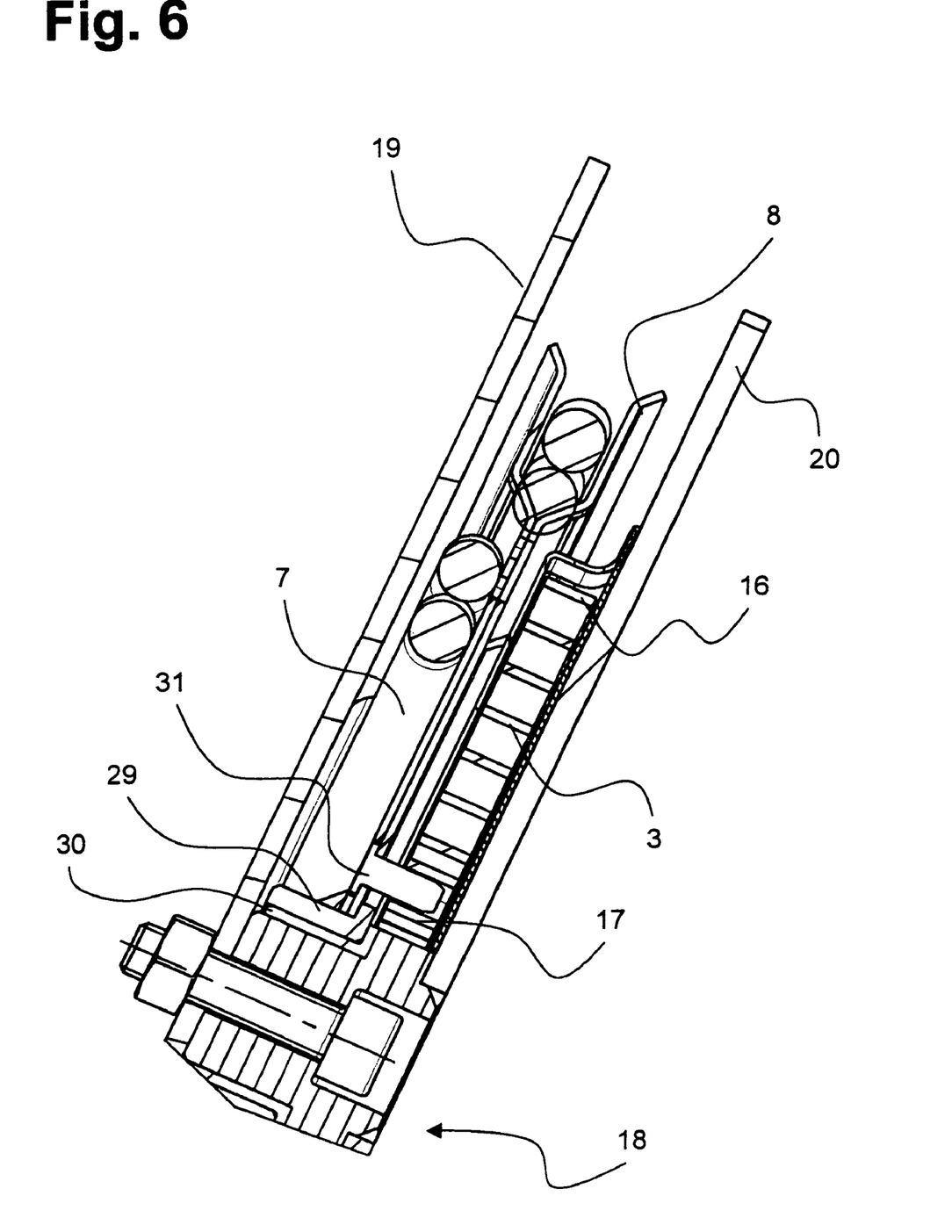
FIG. 6: an enlarged feature per FIG. 5.

FIG. 6 shows an enlarged feature of the line magazine in the view of FIG. 5. Especially noticeable is the fastening of the spring element 3, fashioned as a spiral spring, to the drum disk 2 by means of a pin 31. The spiral spring 3 has its second end 17 wrapped around the pin 31, and its first end 16 is secured to the housing tub 20.

Figure 7:
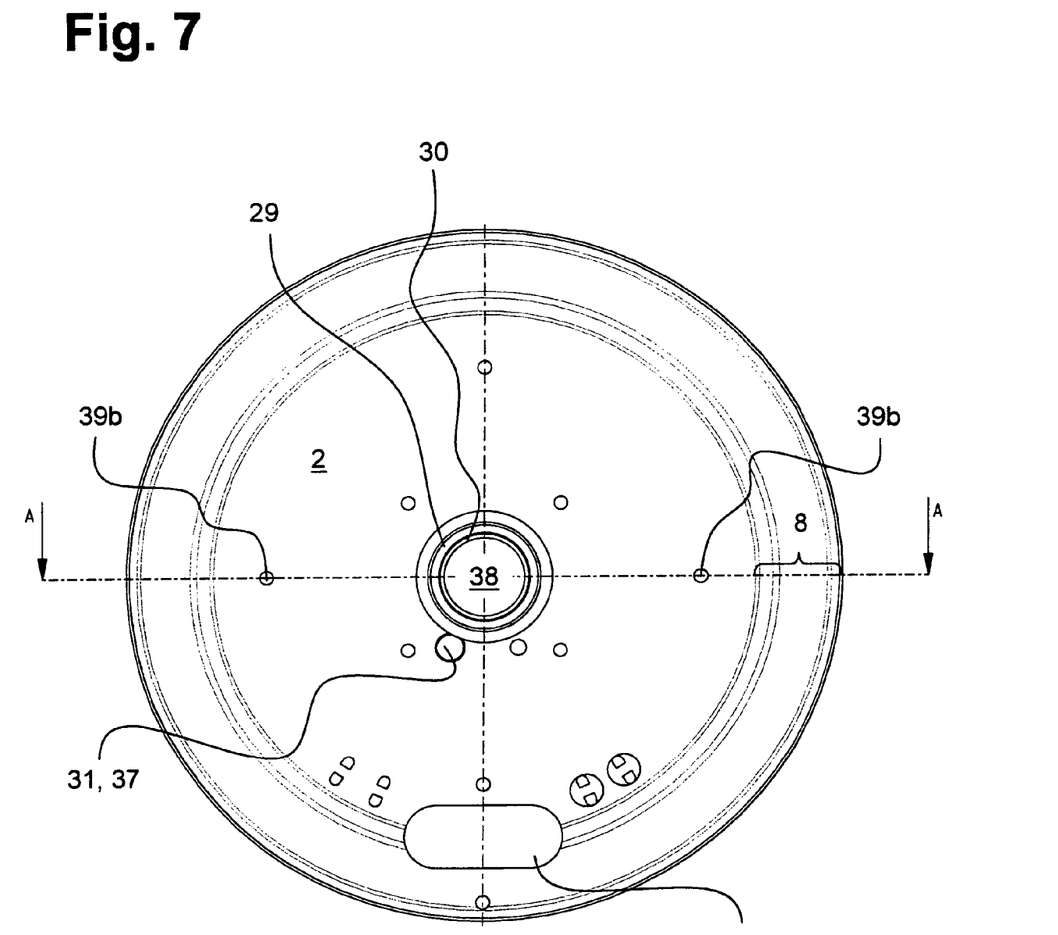
FIG. 7: a top view of the drum disk without supply line.

FIG. 7 shows a top view of only the drum disk 2. At the center of the drum disk 2 is a central borehole 38 to accommodate the mandrel bearing 18 (see FIG. 4). The central borehole 38 is fully surrounded by the slide bearing 30, which is press-fitted into the drum sleeve 29, joined to the drum disk 2 as a single piece. In the immediate vicinity of the drum sleeve 29, the drum disk 2 has another borehole, which is a seat 37 to receive the pin 31 for fixation of the spiral spring 3. Moreover, the drum jacket 8 is suggested in the marginal region of the drum disk 2.

Figure 8:
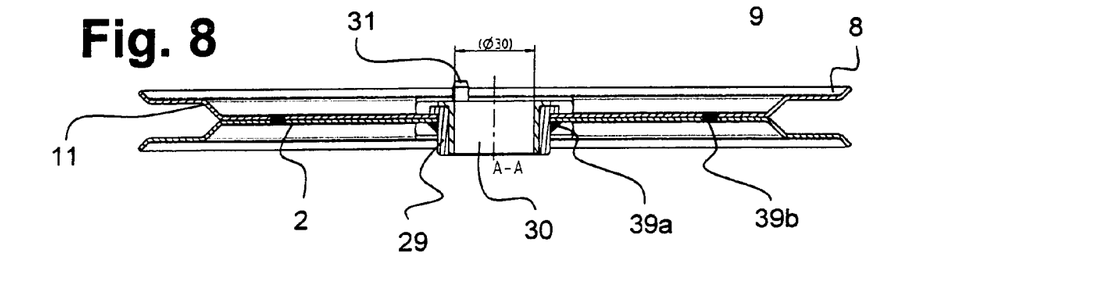
FIG. 8: a cross section on the drum disk along line A-A of FIG. 7.

In FIG. 8, the drum disk 2 is shown in a cross section along line A-A of FIG. 7. FIG. 8 shows the symmetrical layout of the drum disk 2, with two shell-like halves, joined together by individual weld points 39b (also see FIG. 7). The drum sleeve 29 is also firmly connected to the drum disk 2 by a circumferential weld 39a. In FIG. 8, the pin 31 stands out against the drum disk 2 and the drum jacket 8.

LIST OF REFERENCE NUMBERS 1 housing
2 drum disk
3 spring element, spiral spring
4 supply line
5 front line segment
6 wedge connector
7 rear line segment
8 drum jacket
9a, 9b jacket opening
10 multiple winding
11 groove profile
12 aperture width, groove profile
13 diameter, supply line
14 depth of groove profile, profile depth
15 spring space
16 first end of spiral spring
17 second end of spiral spring
18 mandrel bearing
19 housing cover
20 housing tub
21 fastening holes
22 retaining screw
23 line attachment
24 rubber sleeve
25 housing opening
26 clamp fitting
27 pedestal
28 nut
29 drum sleeve
30 slide bearing
31 pin
32 front side of housing
33 rear side of housing
34 swing-out position
35 lowest point of profile
36 top side of housing cover
37 pin seat
38 central borehole
39a weld seam
39b spot welds

The invention claimed is:

1. A trailer and a line magazine for a supply line on the trailer comprising: the trailer having a king pin and a wedge connector pivoted on the king pin, the line magazine comprising a housing and a drum disk mounted in the housing and able to rotate, wherein the drum disk is preloaded by a spring element to accommodate the supply line, wherein the supply line engages by its front segment of line with the wedge connector and is led out from the housing by its rear segment of line in a fixed manner, wherein the drum disk is formed with a drum jacket having a U-profile at a radially outer end on which the front segment of the supply line rests and wherein the U-profile is formed complementary in shape to a cross section of the supply line, and wherein the front line segment is laid as a multiple circumferential spiral winding on the drum jacket.

2. The trailer and line magazine according to claim 1, in which the rear line segment is laid in a spiral on the drum disk.

3. The trailer and line magazine according to claim 2, in which the drum jacket has a jacket opening.

4. The trailer and line magazine according to claim 3, in which the supply line is secured at the jacket opening stationary to the drum disk or the drum jacket or a combination thereof.

5. The trailer and line magazine according to claim 4, in which the drum jacket fully surrounds the drum disk in a circumferential direction.

6. The trailer and line magazine according to claim 5, in which the U-profile has an aperture width slightly larger than a diameter of the supply line.

7. The trailer and line magazine according to claim 6, in which the U-profile has a depth corresponding to at least twice the diameter of the supply line.

8. The trailer and line magazine according to claim 7, in which the spring element is a spiral spring.

9. The trailer and line magazine according to claim 8, in which the spiral spring is arranged in a spring space, which is bounded off from the supply line by the drum disk.

10. The trailer and line magazine according to claim 9, in which the spiral spring is fastened stationary to the housing by a first end of the spiral spring, and a second end of the spiral spring engages with the drum disk or the drum jacket or a combination thereof.

11. The trailer and line magazine according to claim 10, in which the first end is fastened in the radial direction on the outside of the housing and the second end engages with the drum disk on the inside.

12. The trailer and line magazine according to claim 11, in which the drum disk is mounted on an upright mandrel bearing stationary in the housing.

13. The trailer and line magazine according to claim 1, in which the drum jacket has a jacket opening.

14. The trailer and line magazine according to claim 13, in which the supply line is secured at the jacket opening stationary to the drum disk or the drum jacket or a combination thereof.

15. The trailer and line magazine according to claim 1, in which the drum jacket fully surrounds the drum disk in a circumferential direction.

16. The trailer and line magazine according to claim 1, in which the U-profile has an aperture width slightly larger than the diameter of the supply line.

17. The trailer and line magazine according to claim 1, in which the U-profile has a depth corresponding to at least twice a diameter of the supply line.

18. The trailer and line magazine according to claim 1, in which the spring element is a spiral spring.

19. The trailer and line magazine according to claim 18, in which the spiral spring is arranged in a spring space, which is bounded off from the supply line by the drum disk.

20. The trailer and line magazine according to claim 18, in which the spiral spring is fastened stationary to the housing by a first end of the spiral spring, and a second end of the spiral spring engages with the drum disk or the drum jacket or a combination thereof.

21. The trailer and line magazine according to claim 20, in which the first end is fastened in the radial direction on the outside of the housing and the second end engages with the drum disk on the inside.

22. The trailer and line magazine according to claim 1, in which the drum disk is mounted on an upright mandrel bearing stationary in the housing.

* * * * *